(12) United States Patent
Molnar et al.

(10) Patent No.: US 8,897,834 B2
(45) Date of Patent: *Nov. 25, 2014

(54) SIGNALING SUPPORT FOR ANTENNA SELECTION USING SUBSET LISTS AND SUBSET MASKS

(75) Inventors: Karl J. Molnar, Cary, NC (US);
Kambiz Zangi, Chapel Hill, NC (US);
Leonid Krasny, Cary, NC (US);
Stephen Grant, Pleasanton, CA (US);
Jonas B. Karlsson, Tokyo (JP)

(73) Assignee: Optis Cellular Technology, LLC, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/292,738

(22) Filed: Nov. 9, 2011

(65) Prior Publication Data

US 2012/0058767 A1    Mar. 8, 2012

Related U.S. Application Data

(63) Continuation of application No. 11/538,535, filed on Oct. 4, 2006, now Pat. No. 8,068,872.

(60) Provisional application No. 60/724,008, filed on Oct. 6, 2005.

(51) Int. Cl.
| | |
|---|---|
| *H04M 1/00* | (2006.01) |
| *H04B 7/00* | (2006.01) |
| *H04W 4/00* | (2009.01) |
| *H04B 7/02* | (2006.01) |
| *H04B 7/10* | (2006.01) |
| *H04B 7/06* | (2006.01) |
| *H04W 88/02* | (2009.01) |

(52) U.S. Cl.
CPC ............ *H04B 7/024* (2013.01); *H04B 7/061* (2013.01); *H04W 88/02* (2013.01); *H04B 7/0691* (2013.01); *H04B 7/0639* (2013.01); *H04W 71/12* (2013.01); *H04B 7/10* (2013.01)
USPC ........ 455/553.1; 455/500; 455/525; 370/334; 375/267; 375/347

(58) Field of Classification Search
USPC .................................................. 455/436, 450
See application file for complete search history.

(56) References Cited

U.S. PATENT DOCUMENTS

| | | | |
|---|---|---|---|
| 6,452,536 B1 * | 9/2002 | Thomassen | 342/74 |
| 6,804,312 B1 * | 10/2004 | Win et al. | 375/347 |

(Continued)

FOREIGN PATENT DOCUMENTS

| | | |
|---|---|---|
| JP | H10126831 | 5/1998 |
| JP | 2002523999 | 3/2000 |

(Continued)

OTHER PUBLICATIONS

3rd Generation Partnership Project; Technical Specification Group Radio Access network; Multiple-Input Multiple Output in UTRA. 3GPP Standard; 3GPP TR 25.876, 3rd Generation Partnership Project. Mobile Competence Centre: Sophia-Anitpolis Cedex, France. No. v2.0.0 Oct. 1, 2005.

(Continued)

*Primary Examiner* — Timothy Pham
(74) *Attorney, Agent, or Firm* — Vincent J. Allen; James H. Ortega; Carstens & Cahoon, LLP (57) ABSTRACT

A communication device is described herein that has control (or at least partial control) over which virtual antenna(s) in one or more base stations to use for transmissions. In one embodiment, the mobile phone performs the following steps: (1) receives an antenna subset list (from the scheduling unit) which identifies a configuration of virtual antennas that is associated with the base station(s); (2) uses the antenna subset list to select which virtual antenna(s) in the configuration of virtual antennas to use for transmissions; and (3) sends an antenna selection signal (to the scheduling unit) which contains information that instructs/requests the base station(s)/scheduling unit to use the selected virtual antenna(s) for transmissions.

39 Claims, 7 Drawing Sheets

(56) References Cited

U.S. PATENT DOCUMENTS

| | | |
|---|---|---|
| 6,816,115 B1 * | 11/2004 | Redi et al. .................. 342/367 |
| 2002/0062472 A1 * | 5/2002 | Medlock et al. ................ 716/1 |
| 2002/0173302 A1 * | 11/2002 | Baker et al. .................. 455/422 |
| 2004/0002363 A1 | 1/2004 | Cuffaro |
| 2005/0037799 A1 * | 2/2005 | Braun et al. .................. 455/525 |
| 2005/0181739 A1 | 8/2005 | Krasny et al. |
| 2006/0009244 A1 * | 1/2006 | Schacht et al. ................ 455/500 |
| 2006/0034382 A1 * | 2/2006 | Ozluturk et al. .............. 375/267 |
| 2006/0067277 A1 * | 3/2006 | Thomas et al. ................ 370/334 |
| 2006/0171482 A1 * | 8/2006 | Trachewsky .................. 375/267 |
| 2007/0135161 A1 | 6/2007 | Molnar et al. |

FOREIGN PATENT DOCUMENTS

| | | |
|---|---|---|
| JP | 2005142866 | 6/2005 |
| WO | 2004023677 A2 | 3/2004 |
| WO | 2006052058 A2 | 5/2006 |
| WO | 2007024913 A1 | 3/2007 |

OTHER PUBLICATIONS

Universal Motile Telecommunications System (Umts); Physical layer procedures (Fdd), (3GPP Ts 25.214 version 5.7.0 Release 5), Dec. 2003, (Eis! Ts 125 214), 66 pgs.

3rd Generation Partnership Project; Technical Specification Group Radio Access Network; Physical Layer Aspects for Evolved Utra (Release 7) 3GPP Tr 25.814 V0.5.0, Nov. 2005, 72 pgs.

3rd Generation Partnership Project; Technical Specification Group Radio Assess Network; Multiple-Input Multiple Output in Utra, 3GPP Tr 25.876 V1.7.1, Oct. 2005, 72 pgs.

D. Gore, a. Paulraj, Mimo Antenna Subset Selection With Space-Time Coding, Fellow, IEEE Transactions on Signal Processing, vol. 50, No. 10, Oct. 2002,.

* cited by examiner

SIGNALING SUPPORT FOR ANTENNA SELECTION USING SUBSET LISTS AND SUBSET MASKS

CLAIMING BENEFIT OF PRIOR FILED U.S. APPLICATION

This patent application is a continuation of U.S. patent application Ser. No. 11/538,535 filed on Oct. 4, 2006, which claims the benefit of U.S. Provisional Application Ser. No. 60/724,008 filed on Oct. 6, 2005, the contents of which are hereby incorporated by reference herein.

BACKGROUND OF THE INVENTION

1. Field of the Invention

The present invention relates in general to the signaling needed to enable a mobile phone to have at least partial control over which antenna(s) within a coverage area of at least one base station and under control of a scheduling unit are to be used for transmissions to the mobile phone.

2. Description of Related Art

In the wireless communications field, there has been an interest in making sure that the appropriate antenna(s) from within one or more base stations are used for transmitting and receiving signals to and from a mobile phone (user equipment (UE)). For example, in U.S. Pat. No. 6,421,543 there was disclosed a base station that receives cellular radiotelephone communication energy from a mobile phone on an antenna array, processes the received communications energy to produce at least three processed radiotelephone communications signals, and selects at least two of the processed signals for decoding in a conventional decoder. This scheme involves the selection of different received signals at a base station that incorporates a fixed beamforming array antenna.

On the other hand, there are several documents which discuss the potential performance gain from enabling a base station to select antenna(s) for transmitting signals to a mobile phone. For instance, the base station can obtain information from an uplink transmission and then estimate the direction a mobile phone is moving and use that information to select the appropriate antenna(s) which should be used for future transmissions to that mobile phone. The documents include:

D. Gore, R. Heath, and A. Paulraj, Statistical antenna selection for spatial multiplexing systems, In Proc. IEEE Int. Conf., on Communications, New York, April 2002, p. 450-454.

D. Gore and A. Paulraj, Statistical antenna subset selection with space-time coding, IEEE Trans. on Signal Processing, 50:2580-8, October 2002.

R. Narasimham, Spatial multiplexing with transmit antenna and constellation selection for correlated MIMO fading channels, IEEE Trans. on Signal Processing, 51(11):2829-38, November 2003.

As can be seen, antenna selection is not in itself a new concept. However, it would be desirable if the mobile phone itself had at least partial control over which antenna(s) from the antenna configuration associated with the base station should be used for transmissions. For instance, this capability would be desirable because the mobile phone itself has the best knowledge of its interference environment, which it can monitor, rather than having the base station estimate/predict the mobile phone's interference environment. In addition, as the concept of a mobile phone being served by antenna(s) from one base station corresponding to a single cell has been changing such that a cell may now consist of multiple antennas distributed throughout a coverage region and connected to one or more base stations. In this scenario, the antennas that communicate to the mobile phone need to be determined, and the corresponding signaling also needs to be devised. These particular needs and other needs are satisfied by the present invention.

BRIEF DESCRIPTION OF THE INVENTION

A mobile phone is described herein that has control (or at least partial control) over which antenna(s) in at least one base station should be used for transmissions. In one embodiment, the mobile phone performs the following steps: (1) receives an antenna subset list (from the scheduling unit) which identifies a configuration of virtual antennas that is associated with the base station(s); (2) uses the antenna subset list to select which virtual antenna(s) should be used for transmissions; and (3) sends an antenna selection signal (to the scheduling unit) which contains information that instructs/requests the base to station(s)/scheduling unit to use the selected virtual antenna(s) for transmissions.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
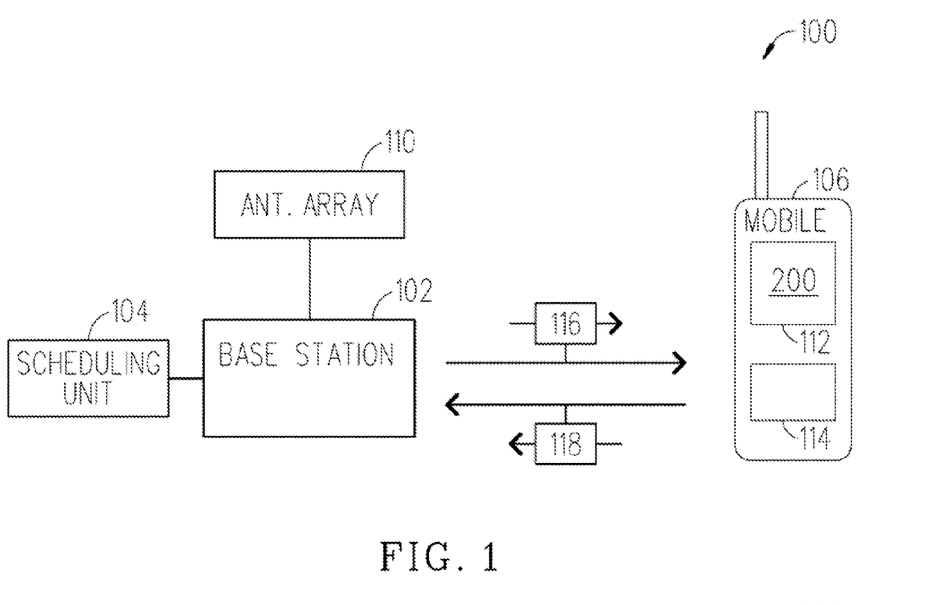
FIG. 1 is a block diagram of a communication system which includes a scheduling unit, a base station and a mobile phone that signal one another so that the mobile phone has at least partial control over which antenna(s) associated with the base station should be used for transmissions to the mobile phone in accordance with the present invention.

Referring to FIG. 1, there is shown a block diagram of a communication system 100 including a base station 102 (connected to a scheduling unit 104) and a mobile phone 106 (UE 106) which signal one another so that the mobile phone 106 has at least partial control over which virtual antenna(s) within a configuration of virtual antennas 110 associated with the base station 102 is/are to be used for subsequent transmissions to the mobile phone 106. As discussed below, the configuration of virtual antennas is denoted as the antenna configuration and represents the mapping of signals to physical antenna elements. The scheduling unit 104 is shown connected to the base station 102, however, the scheduling unit could also be incorporated within the base station 102. For clarity, the description that is provided herein does not discuss components/details associated with the base station 102 and the mobile phone 106 that are well known in the industry and are not needed to understand the present invention.

As shown, the mobile phone 106 includes a processor 112 and a memory 114 which has instructions stored therein that are accessible and able to be processed by the processor 112 to facilitate the following (see method 200 in FIG. 2): (1) obtain an antenna subset list 116 (e.g., from scheduling unit 104) which identifies the configuration of virtual antennas 110 within the base station 102 (see step 202 in FIG. 2); (2) use the antenna subset list 116 to select one or more virtual antenna(s) associated with the configuration of virtual antennas 110 which should be used for subsequent transmissions (see step 204 in FIG. 2); and (3) send an antenna selection signal 118 which contains information that instructs/requests the scheduling unit 104 to use the selected virtual antenna(s) within the configuration of virtual antennas 110 for subsequent transmissions (see step 206 in FIG. 2). A detailed description is provided next in which several different signaling schemes (i.e., different types of antenna subset lists 116) are discussed where anyone of these schemes (or antenna subset lists 116) enables the mobile phone 106 to select one or more virtual antenna(s) within the configuration of virtual antennas 110 of the base station 102 which should be used for subsequent transmissions to the mobile phone 106.

Figure 2:
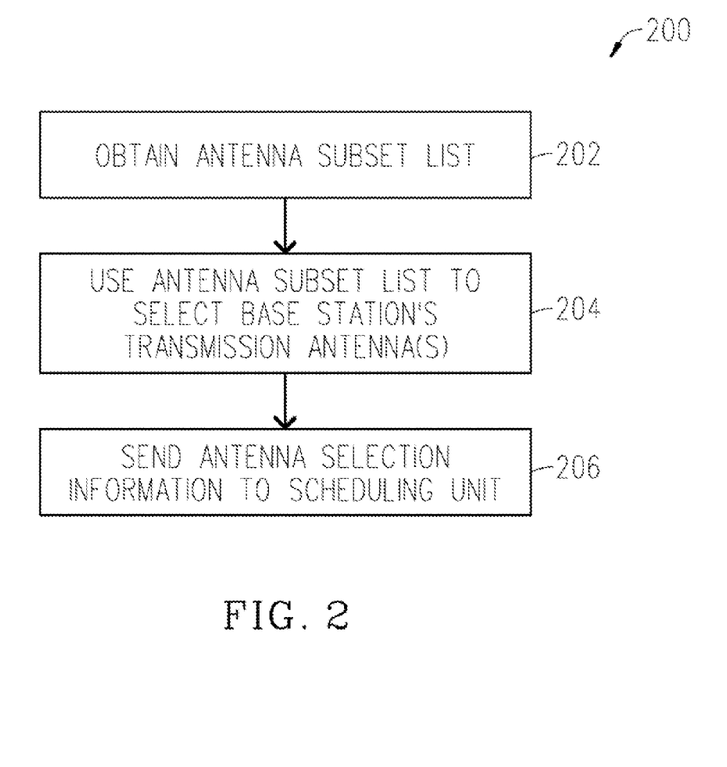
FIG. 2 is a flowchart illustrating the basic steps of the method for enabling a mobile phone to have at least partial control over which antenna(s) associated with a scheduling unit should be used for subsequent transmissions in accordance with the present invention.
Figure 3A:
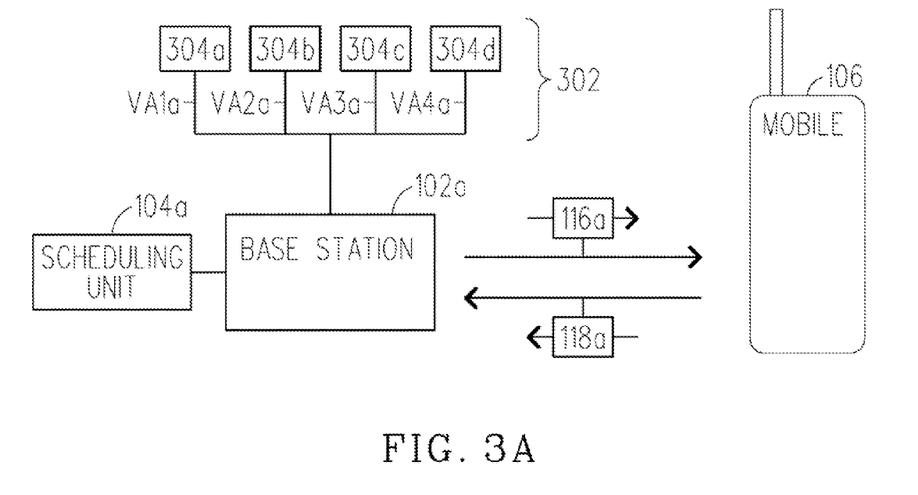
FIGS. 3A-3B are two drawings which are used to help explain how when the mobile phone obtains a concurrent antenna subset list it is then able to select one or more virtual antenna(s) from the configuration of virtual antennas associated with the scheduling unit that should be used for subsequent transmissions in accordance with the present invention.
Figure 3B:
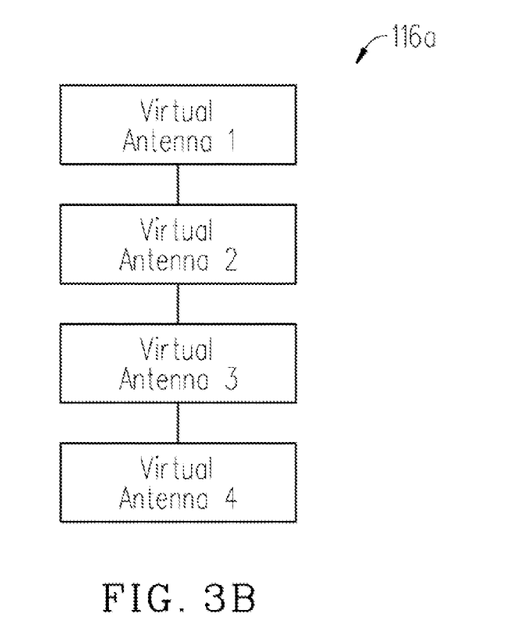

Referring to FIGS. 3A-3B, there are illustrated two drawings which are used to help explain how when the mobile phone 106 obtains a concurrent antenna subset list 116a it is able to select one or more antenna(s) from a diversity antenna configuration 302 associated with the base station 102a that should be used for transmissions. In FIG. 3A, the exemplary single base station 102a shown is connected to the scheduling unit 104a and uses four virtual antennas VA1a, VA2a, VA3a and VA4a to map a data signal to four diversity antennas 304a, 304b, 304c and 304d for transmission to the mobile phone 106. In this example, the base station 102a (in conjunction with the scheduling unit 104a) also transmits the concurrent antenna subset list 116a to the mobile station 106 (see step 202 in FIG. 2). As shown in FIG. 3B, the concurrent antenna subset list 116a is configured in a manner where it indicates that configuration of virtual antennas 302 contains four diversity antennas 304a, 304b, 304c and 304d.

Upon receiving the concurrent antenna subset list 116a, the mobile phone 106 knows that it can select any combination of one or more of the four virtual antenna(s) VA1a, VA2a, VA3a and/or VA4a associated with the base station 102a that should be used for transmissions (see step 204 in FIG. 2). To make this selection, the mobile phone 106 could measure a pilot signal which is assumed to be associated with each transmit antenna 304a, 304b, 304c and/or 304d and then make a decision as to which virtual antenna(s) VA1a, VA2a, VA3a and/or VA4a should be used for further transmission. Subsequently, the mobile phone 106 sends an antenna selection list 118a which contains information instructing/requesting the scheduling unit 104a to use the selected virtual antenna(s) VA1a and VA4a (for example) for future transmissions (see step 206 in FIG. 2). In one embodiment, the mobile phone 106 could send the antenna selection signal 118a as part of the feed-back for a link adaptation process for the high-speed downlink packet-data access (HSPDA) mode in a Wideband Code Division Mode Access (WCDMA) communication network 100.

Figure 4A:
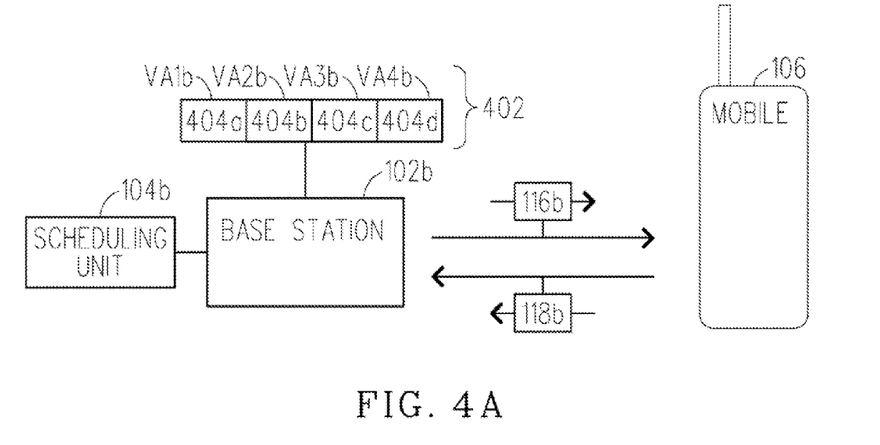
FIGS. 4A-4C are three drawings which are used to help explain how when the mobile phone obtains a mutually exclusive antenna subset list it is then able to select only one virtual antenna from the configuration of virtual antennas associated with the scheduling unit that should be used for subsequent transmissions in accordance with the present invention.
Figure 4B:
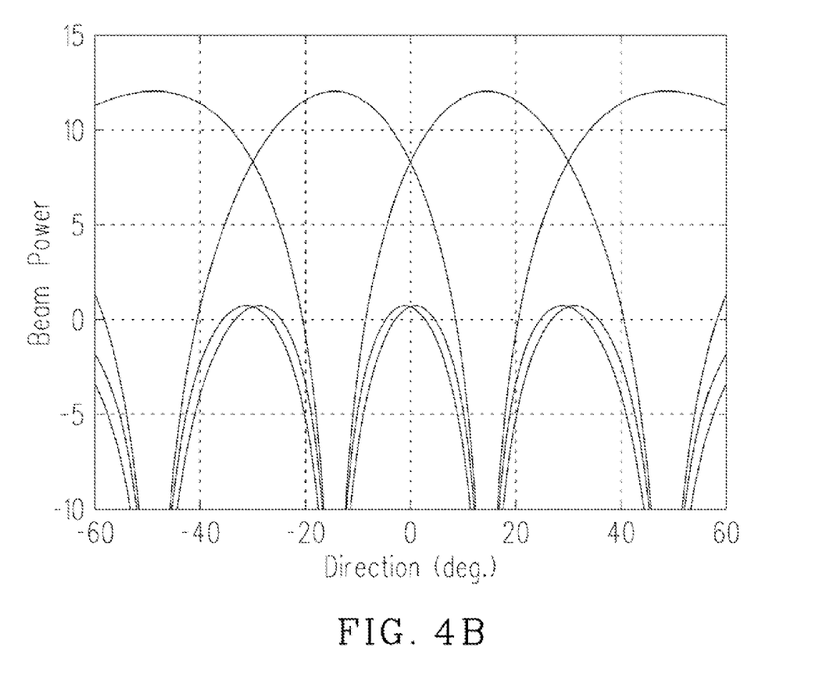
Figure 4C:
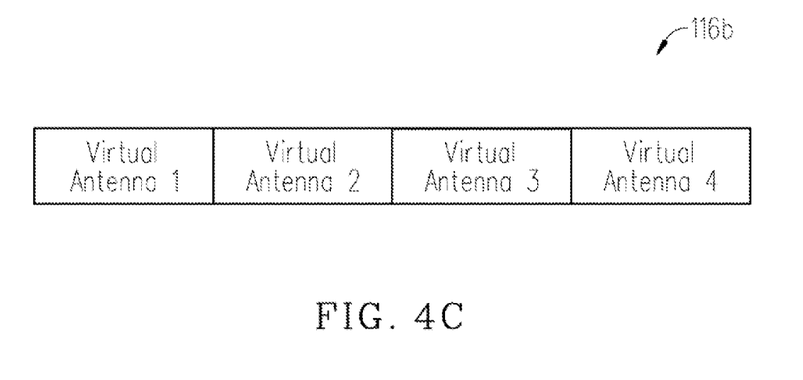

Referring to FIGS. 4A-4C, there are illustrated three drawings which are used to help explain how when the mobile phone 106 obtains a mutually exclusive antenna subset list 116b it is able to select one virtual antenna (i.e. beam) from a fixed-beam antenna configuration 402 associated with the base station 102b that should be used for transmissions. In FIG. 4A, the exemplary single base station 102b is connected to scheduling unit 104b and uses four virtual antennas VA1b, VA2b, VA3b and VA4b to map a data signal to four antennas 404a, 404b, 404c and 404d within the fixed-beam antenna configuration 402 for transmission to the mobile phone 106. In this particular fixed-beam antenna configuration 402, only one of the virtual antennas VA1b, VA2b, VA3b and VA4b transmits at any given time to the mobile phone 106. The beam pattern for an exemplary 120° sector covered by the four-beam, fixed-beam antenna configuration 402 is shown in FIG. 4B.

In this example, scheduling unit 104b instructs the base station 102b to transmit the mutually exclusive antenna subset list 116b to the mobile station 106 (see step 202 in FIG. 2). As shown in FIG. 4C, the mutually exclusive antenna subset list 116b is configured in a manner where it indicates that the configuration of virtual antennas 402 is a four-beam, fixed-beam antenna configuration 402. Upon receiving the mutually exclusive antenna subset list 116b, the mobile phone 106 knows that it can select only one of the virtual antennas VA1, VA2, VA3 or VA4 associated with the base station 102b from which to receive transmissions (see step 204 in FIG. 2). After making this selection, the mobile phone 106 sends the antenna selection signal 118b which contains information instructing/requesting the scheduling unit 104b to use the selected virtual antenna VA2b (for example) for future transmissions (see step 206 in FIG. 2).

As can be seen, the mutually exclusive antenna subset list 116b (shown in FIG. 4C) is different than the concurrent antenna subset list 116*a* (shown in FIG. 3B). This was done to indicate how particular configurations of virtual antennas may be identified by using different types of signaling in accordance with the present invention. For the diversity antenna configuration 302, the mobile phone 106 is allowed to choose one or more of the four virtual antennas VA1*a*, VA2*a*, VA3*a* and VA4*a* from which to receive a transmission and this is indicated by the vertically-linked antenna subset list 116*a* (see FIG. 3B). For the fixed-beam antenna configuration 402, however, the mobile phone 106 is allowed to choose only one of the four virtual antennas VA1*b*, VA2*b*, VA3*b* or VA4*b* from which to receive a transmission and this is indicated by the horizontally-linked antenna subset list 116*b* (see FIG. 4C). Thus, the vertical dimension is used to represent where a set of virtual antennas can be transmitted at the same time (i.e. concurrent transmission), while the horizontal dimension is used to represent where only one virtual antenna can be used at a time to transmit (i.e. mutually exclusive transmission).

Figure 5A:
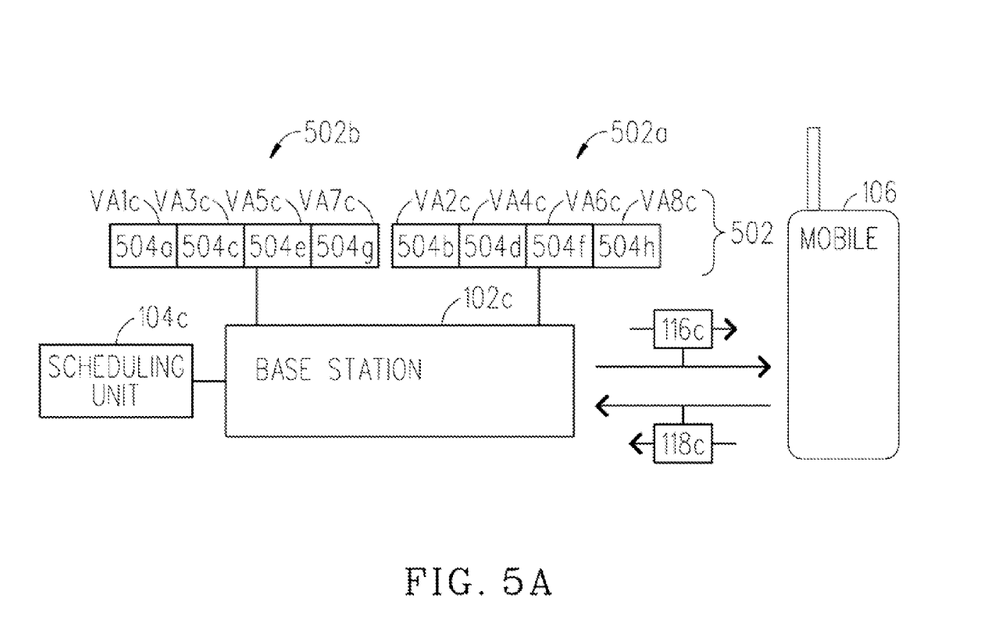
FIGS. 5A-5C are three drawings which are used to help explain how when the mobile phone obtains an antenna subset list that is the concurrent combination of two mutually exclusive antenna subset lists it is then able to select one virtual antenna from the configuration of virtual antennas described by the first mutually exclusive antenna subset list and/or one virtual antenna from the configuration of virtual antennas described by the second mutually exclusive antenna subset list associated with the scheduling unit that should be used for subsequent transmissions in accordance with the present invention.
Figure 5B:
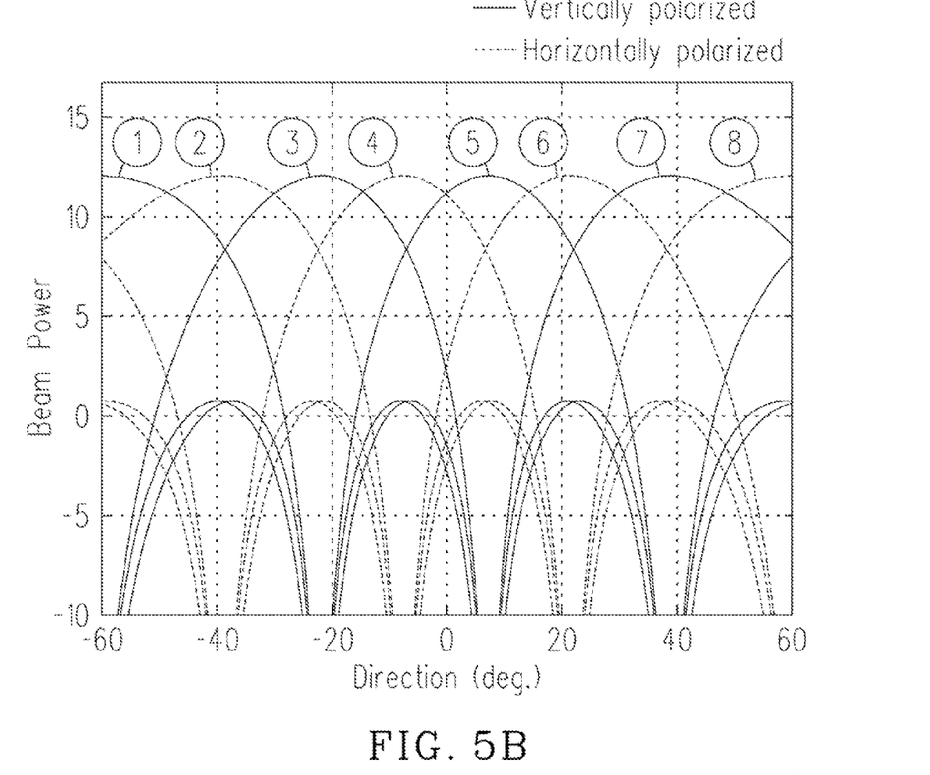
Figure 5C:
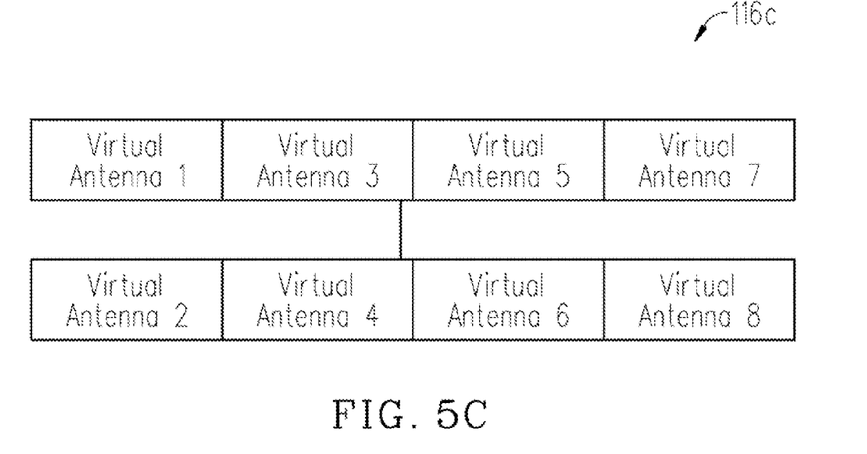

Referring to FIGS. 5A-5C, there are illustrated three drawings which are used to help explain how when the mobile phone 106 obtains a concurrently combined antenna subset list 116*c* it is able to select one or more virtual antenna(s) from the configuration of virtual antennas 502 that is comprised of the two separate fixed-beam antenna configurations 502*a* and 502*b* that should be used for transmissions. The fixed-beam antenna configuration 502*a* is made up of antenna elements which have horizontal polarization. While, the fixed-beam antenna configuration 502*b* is made up of antenna elements with vertical polarization. Both antenna configurations 502*a* and 502*b* are associated with the base station 102*c*. In FIG. 5A, the exemplary single base station 102*c* is connected to scheduling unit 104*c* which uses eight virtual antennas VA1*c*, VA2*c* . . . VA8*c* to map a data signal to eight antennas 504*a*, 504*b* . . . 504*h* within the dual-polarized fixed-beam antenna configuration 502 for transmission to the mobile phone 106. The beam pattern for an exemplary 120° dual-polarized fixed beamformer antenna array 502 is shown in FIG. 5B. In this figure, the beam patterns represented by dashed lines correspond to the beams from the horizontally polarized beamformer 502*a*, while the beam patterns represented by the solid lines correspond to the beams from the vertically polarized beamformer 502*b*.

In this example, the base station 102*c* together with the scheduling unit 104*c* transmits the concurrently combined antenna subset list 116*c* to the mobile station 106 (see step 202 in FIG. 2). As shown in FIG. 5C, the concurrently combined antenna subset list 116*c* is configured in a manner where it indicates that the configuration of virtual antennas 502 within the base station 102*c* includes the fixed-beam antenna configuration 502*a* and the fixed-beam antenna configuration 502*b*. Upon receiving the concurrently combined antenna subset list 116*c*, the mobile phone 106 knows that it can select up to one virtual antenna VA1*c*, VA2*c* VA8*c* from each fixed-beam antenna configurations 502*a* and 502*b* from which to receive transmissions (see step 204 in FIG. 2). For instance, the mobile phone 106 can select virtual antenna VA2*c* from the fixed-beam (horizontal polarization) antenna configuration 502*a*. Alternatively, the mobile phone 106 can select virtual antennas VA3*c* and VA8*c* from both the fixed-beam antenna configurations 502*a* and 502*b*. After making this selection, the mobile phone 106 sends an antenna selection signal 118*c* which contains information instructing/requesting the scheduling unit 104*c* to use the selected antenna(s) VA3*c* and VA8*c* (for example) for future transmissions (see step 206 in FIG. 2).

Figure 5D:
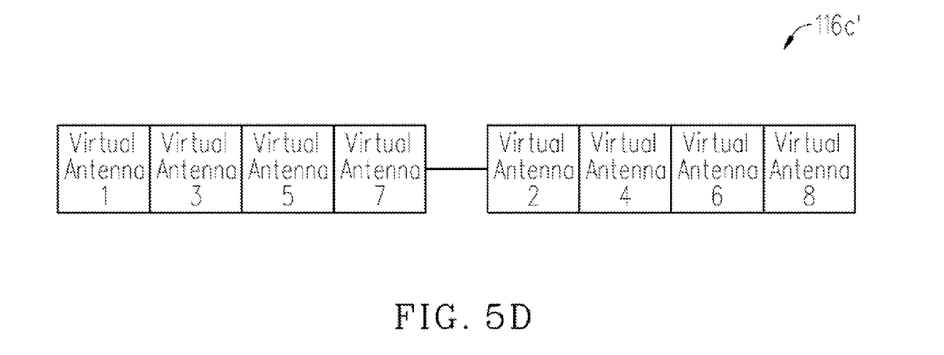
FIG. 5D is a drawing which is used to help explain how when the mobile phone obtains an antenna subset list that is a mutually exclusive combination of two configurations of virtual antennas it is then able to select one virtual antenna from either the first configuration of virtual antennas or the second configuration of virtual antennas associated with the scheduling unit that should be used for subsequent transmissions in accordance with the present invention.

The above example illustrated by FIGS. 5A, 5B and 5C show how a first antenna subset list and a second antenna subset list can be combined to represent the concurrent combination of a first configuration of virtual antennas VA1*c*, VA3*c*, VA5*c* and VA7*c* and a second configuration of virtual antennas VA2*c*, VA4*c*, VA6*c* and VA8*c*. This concurrent combination allows virtual antennas to be selected from the first configuration of virtual antennas and/or the second configuration of virtual antennas. However, it is also possible to combine the two configurations of virtual antennas VA1*c*, VA2*c* . . . VA8*c* into a mutually exclusive combination, so that one antenna can be selected from either the first configuration of virtual antennas VA1*c*, VA3*c*, VA5*c* and VA7*c* or the second configuration of virtual antennas VA2*c*, VA4*c*, VA6*c* and VA8*c*. The antenna list 116*c*' for this mutually exclusive combination is shown in FIG. 5D. Now the mobile phone 106 may select one virtual antenna from the first configuration of virtual antennas VA1*c*, VA3*c*, VA5*c* or VA7*c* or from the second configuration of virtual antennas VA2*c*, VA4*c*, VA6*c* or VA8*c*, but not from both configurations of virtual antennas.

Figure 6A:
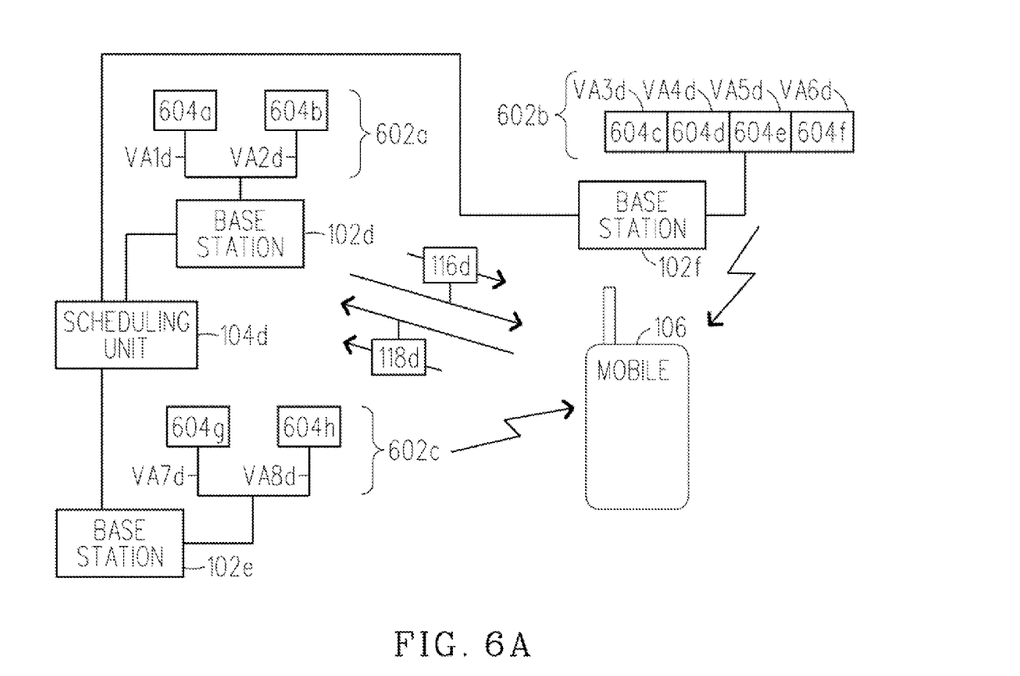
FIGS. 6A-6B are two drawings which are used to help explain how when the mobile phone obtains a concurrently combined antenna subset list it is then able to select one or more antenna(s) from distributed base stations associated with the scheduling unit that should be used for subsequent transmissions in accordance with the present invention.
Figure 6B:
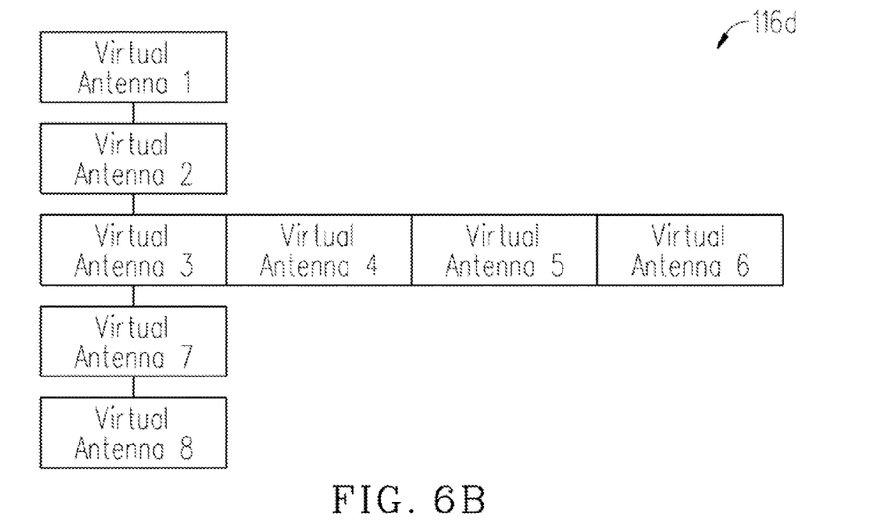

Referring to FIGS. 6A-6B, there are illustrated two drawings which are used to help explain how when the mobile phone 106 obtains a concurrently combined antenna subset list 116*d* it is able to select one or more antenna(s) from the distributed configurations of virtual antennas 602*a*, 602*b* and 602*c* associated with a base station 102*d*, 102*e* and 102*f*, respectively, that should be used for transmissions. In FIG. 6A, the exemplary base stations 102*d*, 102*e* and 102*f* are connected to the scheduling unit 104*d* and use eight virtual antennas VA1*d*, VA2*d*, . . . , VA8*d* to map a data signal to two antennas 604*a* and 604*b* (within a diversity antenna configuration 602*a*), four antennas 604*c*, 604*d*, 604*e* and 604*f* (within a fixed-beam antenna configuration 602*b*) and two antennas 604*g* and 604*h* (within a diversity antenna configuration 602*c*). The scheduling unit 104*d* could, alternatively, be contained within one of the base stations (e.g. base station 102*d*), and in this case base station 102*e* and base station 102*f* would be connected to the scheduling unit 104*d* via base station 102*d*. In this example, the scheduling unit 104*d* transmits a concurrently combined antenna subset list 116*d* to the mobile station 106 (see step 202 in FIG. 2). As shown in FIG. 6B, the concurrently combined antenna subset list 116*d* is configured in a manner where it is indicates that there is a diversity antenna configuration 602*a* with two virtual antennas VA1*d* and VA2*d*, a fixed-beam antenna configuration 602*b* with four virtual antennas VA3*d*, VA4*d*, VA5*d* and VA6*d* and a diversity antenna configuration 602*c* with two virtual antennas VA7*d* and VA8*d*, all associated with the scheduling unit 104*d*. Upon receiving the concurrently combined antenna subset list 116*d*, the mobile phone 106 knows it can select virtual antenna VA1*d* and/or virtual antenna VA2*d* and/or one of virtual antennas VA3*d*, VA4*d*, VA5*d* and VA6*d* and/or virtual antenna VA7*d* and/or virtual antenna VA8*d* from which to receive a transmission (see step 204 in FIG. 2). After making this selection, the mobile phone 106 sends an antenna selection signal 118*d* which contains information instructing/requesting the scheduling unit 104*d* to use the selected antenna(s) VA3*d* and VA8*d* (for example) for future transmissions (see step 206 in FIG. 2).

In terms of signaling, the antenna subset lists 116 (e.g., antenna subset lists 116*a*, 116*b*, 116*c* and 116*d*) can be communicated to the mobile phone 106, for example, during the setup period when the mobile phone 106 establishes communication with the base station 102 (e.g., base stations 102*a*, 102*b*, 102*c*, 102*d*, 102*e*, and 102*f*) and scheduling unit 104 (e.g., scheduling units 104*a*, 104*b*, 104*c* and 104*d*). This signaling may also occur during a procedure such as a handover to another cell or between different sets of configurations of virtual antennas. In addition to signaling the antenna subset list 116, the base station 102 can also signal information about the structure of the pilot channels for the specific antennas to enable the mobile phone 106 to make channel estimations for demodulation and to report channel quality information back to the base station 102.

In a different embodiment, the base station 102 does not need to transmit the antenna subset list 116 to the mobile phone 106. Instead, the mobile phone 106 can store a number of antenna subset lists 116 along with some mapping information. In this way, the relevant antenna subset list 116 can be made readily available if the mobile phone 106 knows its current position within a communication network 100 by using for example a global positioning system (GPS). In yet another embodiment, the mobile phone 106 can build the antenna subset list 116 over time as the mobile phone 106 encounters transmissions from the virtual antennas in configuration(s) of virtual antennas of a particular base station 102. In this case, the mobile phone 106 may also need to store additional information such as the cell identification number of the encountered antenna while constructing the antenna subset list 116.

Another feature of the present invention is discussed next which can be implemented if the scheduling unit 104 does not want to give the mobile phone 106 full control over the selection of the transmission antenna(s). To retain some control, the scheduling unit 104 could use an antenna subset mask to prevent one or more of the antennas identified in the antenna subset list 116 from being available to be selected by the mobile phone 106. For example, the scheduling unit 104 may want to prevent certain antenna(s) from being selected by the mobile phone 102, if the scheduling unit 104 knows that the antenna subset list 116 represents a coverage area that is larger than that which can be seen by the mobile phone 106.

Figure 7:
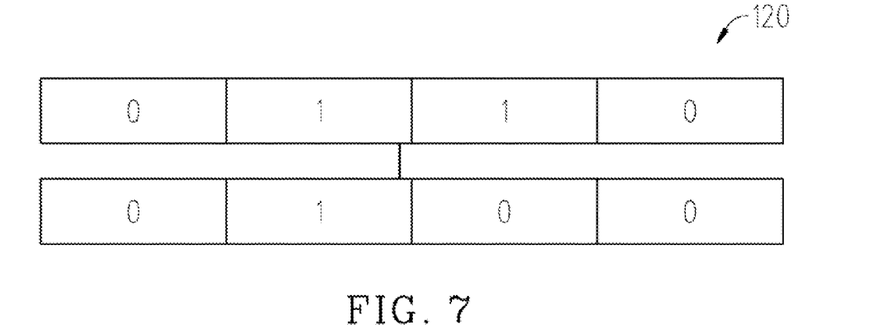
FIG. 7 is a diagram which is used to help explain how the scheduling unit could use an antenna subset mask to limit the number of antennas identified in the antenna subset list which would be available to be selected by the mobile phone for subsequent transmissions in accordance with the present invention.
Figure 8:
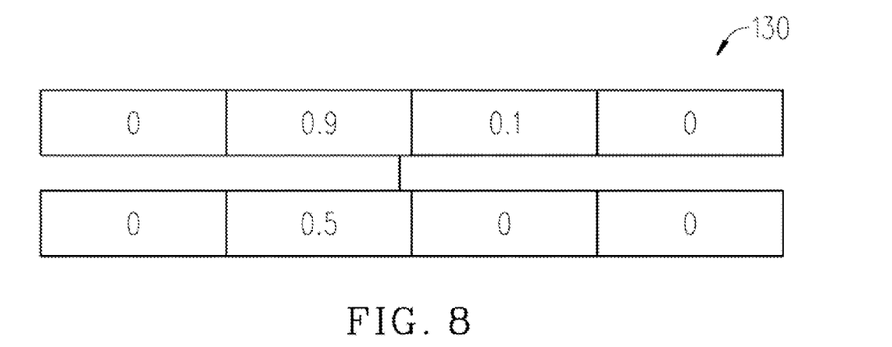
FIG. 8 is a diagram which is used to help explain how the scheduling unit could use a weighted antenna subset mask to limit the number of antennas identified in the antenna subset list which would be available to be selected by the mobile phone for subsequent transmissions in accordance with the present invention.

Consider, the dual-polarized fixed beamformer example that was described above with respect to FIGS. 5A-5C and assume the mobile phone 106 is located at −8 degrees. When the mobile phone 106 is located at −8 degrees, the virtual antennas numbered {3, 4, 5} are the only beams that are visible to the mobile phone 106 (i.e. the signals from virtual antennas {3, 4, 5} are the only signals strong enough to be observed above the noise level by the mobile phone 106). Consequently, while there are 8 potential virtual antennas/beams that the scheduling unit 104 has available, only three are of potential use for transmitting to this mobile phone 106 when it is located at −8 degrees. This situation may be observable by the base station 102 (in particular the scheduling unit 104) when it uses the uplink to compute a direction/location of the mobile phone 106 (for example). In this case, the scheduling unit 104 can use an antenna subset mask 120, which is a list of the same size as the antenna subset list 116, but it also specifies those antennas that are available to the mobile phone 106 (see FIG. 7). With this particular antenna subset mask 120, the only virtual antennas (i.e. beams) which can be selected by the mobile phone 106 are virtual antennas {3, 4, 5}. As can be seen, the use of the antenna subset mask 120 makes for a more efficient use of the virtual antennas which are identified in the antenna subset list 116. Another advantage of using the antenna subset mask 120 is that it can reduce the feedback requirements on the mobile phone 106 in reporting the channel quality to the base station 102. In the above example, the mobile phone 106 would only need to transmit channel quality reports for virtual antennas {3, 4, 5} rather than the full set of virtual antennas { 1, 2, . . . 8}. If desired, the antenna subset mask may also indicate the priority of antennas that the mobile phone 106 should choose in selecting the antenna(s) for future transmissions. The antenna subset mask 130 shown in FIG. 8 indicates this particular feature by incorporating weighted values instead of binary ones and zeros. Weight values of zero indicate that the corresponding virtual antennas VA1c, VA2c, VA6c, VA7c and VA8c should not be used, while higher weight values give priority to virtual antennas VA3c, VA4c and VA5c. Thus, the priority for this configuration of virtual antennas, from highest to lowest, is given by the virtual antennas {3, 4, 5} as shown by the antenna subset mask 130.

In another embodiment, the mobile phone 106 can itself create the antenna subset mask 120 for instance after measuring the signal strengths which accurately reflects both the propagation from the antenna to the mobile phone 106 as well as the effects of intra-cell or inter-cell interference. And, if the mobile phone 106 has interference cancellation capabilities then it could create the antenna subset mask 120 after it makes its signal-to-interference-plus-noise (SINR) measurements. Once, the mobile phone 106 creates the antenna subset mask 120 it may communicate the antenna subset mask 120 to the base station 102 and/or scheduling unit 104. The communication of the antenna subset mask 120 to and from the base station 102/scheduling unit 104 may occur at a rate that is different than the rate required for communicating the antenna subset list 116. For example, the antenna subset list 116 may be communicated during the call setup or handover while the antenna subset mask 120 is communicated periodically or as it changes.

In the foregoing discussion, the present invention was discussed in the situation where all of the antennas (virtual antennas) belong to a single scheduling unit 104. However, as the mobile phone 106 changes position, the antennas (virtual antennas) from other scheduling unit(s) may become visible to the mobile phone 106. In this case, a new antenna subset list and new antenna subset mask could be created for these new antennas (virtual antennas) to facilitate the negotiation as to which virtual antennas/beams should be used for handover with neighboring cells. This could be performed in different ways as follows:

A second antenna subset list and a second antenna subset mask can be created with respect to the antennas (virtual antennas) associated with the other scheduling unit. A procedure that is similar to what was described above would be used for this purpose. At some point, scheduling control is switched from the old scheduling unit 104 to the new scheduling unit and this change would be communicated to the mobile phone 106.

An alternative method is to augment the existing antenna subset list 116 and the existing antenna subset mask 120 to include antennas (virtual antennas) from the other scheduling unit. As the signal quality for the antennas (virtual antennas) associated with the other scheduling unit improves (e.g. based on improving SINR measurements), then these new antennas (virtual antennas) can be used for transmission if permitted by the antenna subset mask 120. Similarly, as the signal quality for antennas (virtual antennas) from the existing scheduling unit 104 degrades, then the original antenna subset list 116 and the original antenna subset mask 120 can be cleared.

There are several circumstances in which it would be advantageous if the mobile phone 106 has control (or at least partial control) over which virtual antenna(s) associated with the base station 102 are to be used for transmissions to the mobile phone 106. For instance, if the mobile phone 106 is able to select the transmit antennas in a base station 102 then this could lead to significant improvements in performance for multi-antennas schemes like the HSPDA scheme which transmits by using the same number of data streams and transmit antennas. Also, when multi-antenna transmission (even without using link adaptation) is coupled with antennas having orthogonal polarizations, it has been empirically found that the propagation of one polarization may be dominant when compared to the other polarization. Thus, it may be preferable if the mobile phone 106 instructed the base station 102 to transmit using the antenna(s) with the stronger polarization. Moreover, in a beamforming system it may be preferable if the mobile phone 106 determines which antennas/beams are to be used for transmission since the mobile phone 106 already has to determine and report other channel quality indicator (CQI) parameters. In other words, it would be advantageous if the mobile phone 106 also reported which antenna/beam should be used for transmission rather than relying on the base station 102 to make this determination. In this case, the advantage is that the mobile phone 106 can make CQI measurements on the same antennas/beams that will be used for demodulation and thus avoid any mismatches that can occur when transmitting from a separate sector antenna.

Although several embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

What is claimed is:

1. A wireless communication apparatus, comprising:
   a processor; and
   a memory with instructions stored therein, wherein the instructions are accessible and processable by the processor, wherein the processor is configured to:
      obtain an antenna subset list that identifies one or more configurations of virtual antennas associated with a scheduling unit that is associated with at least one base station, wherein at least one identified configuration of virtual antennas includes a plurality of virtual antennas and wherein the antenna subset list indicates whether one virtual antenna or multiple virtual antennas of the at least one identified configuration can be selected for transmission;
      use the antenna subset list to aid in selecting which virtual antenna(s) in the configuration of virtual antennas to use for transmissions, wherein the processor further employs an antenna subset mask to prevent one or more of the virtual antenna(s) indicated as being available in the antenna subset list from being selected for transmissions; and
      send an antenna selection signal that contains information requesting the scheduling unit to use the selected virtual antenna(s) for transmissions.

2. The apparatus of claim 1, wherein the processor is configured to obtain the antenna subset list by receiving a signal which contains the antenna subset list from the scheduling unit.

3. The apparatus of claim 2, wherein the signal that contains the antenna subset list is communicated during a set-up period or during a handover procedure with the scheduling unit.

4. The apparatus of claim 1, wherein the processor is configured to obtain the antenna subset list by creating the antenna subset list after receiving signals from one or more of the virtual antennas associated with the scheduling unit.

5. The apparatus of claim 1, wherein the processor is configured to obtain the antenna subset list by retrieving the antenna subset list from the memory utilizing positional information which is provided by the GPS unit.

6. The apparatus of claim 1, wherein the processor is configured to transmit the antenna subset list to the scheduling unit/base station(s).

7. The apparatus of claim 1, wherein the processor is configured to include in the antenna selection signal information to prevent one or more of the virtual antenna(s) that were indicated as being available in the antenna subset list from being selected for transmissions.

8. The apparatus of claim 7, wherein the processor is configured to generate the antenna subset mask by measuring one or more characteristics of signal(s) that are transmitted from the virtual antenna(s) associated with the scheduling unit.

9. The apparatus of claim 7, wherein the processor is configured to receive the antenna subset mask from the scheduling unit/base station(s).

10. The apparatus of claim 7, wherein the processor is configured to communicate the antenna subset list to/from the scheduling unit at a different rate than the antenna subset mask is communicated to/from the scheduling unit.

11. The apparatus of claim 1, wherein the processor is configured to use the antenna subset list by using a weighted antenna subset mask to prioritize one or more of the virtual antennas which were indicated as being available in the antenna subset list.

12. The apparatus of claim 1, wherein the antenna subset list comprises a concurrent antenna subset list that allows at least one virtual antenna to be selected for transmission.

13. The apparatus of claim 1, wherein the antenna subset list comprises a mutually exclusive antenna subset list that allows at most one virtual antenna to be selected for transmission.

14. The apparatus of claim 1, wherein the antenna subset list comprises a concurrent combination of a first antenna subset list and a second antenna subset list that allows at least one virtual antenna to be selected from the first antenna subset list and/or at least one virtual antenna to be selected from the second antenna subset list.

15. The apparatus of claim 1, wherein the antenna subset list comprises a mutually exclusive combination of a first antenna subset list and a second antenna subset list that allows one virtual antenna to be selected from either the first antenna subset list or the second antenna subset list.

16. The apparatus of claim 1, wherein the processor is configured to receive another antenna subset list from another scheduling unit to help facilitate a handover from the scheduling unit to the another scheduling unit.

17. The apparatus of claim 1, wherein the processor is further configured to obtain the antenna subset list by receiving an antenna subset list that is further augmented to include information about a configuration of virtual antennas associated with another scheduling unit to help facilitate a handover from the scheduling unit to the another scheduling unit.

18. A method for enabling a communication device to have at least partial control over which antenna(s) associated with a scheduling unit to use for subsequent transmissions, the method comprising:
   obtaining an antenna subset list that identifies one or more configurations of virtual antennas for one or more base station(s) associated with the scheduling unit, wherein at least one identified configuration of virtual antennas includes a plurality of virtual antennas and wherein the antenna subset list indicates whether one virtual antenna or multiple virtual antennas of the at least one identified configuration can be selected for transmission;

using the antenna subset list to select which virtual antenna(s) in the configuration of virtual antennas to use for transmissions, including using an antenna subset mask to prevent one or more of the virtual antenna(s) that were indicated as being available in the antenna subset list from being selected for the subsequent transmissions; and sending an antenna selection signal which contains information requesting that the scheduling unit use the selected virtual antenna(s) for the subsequent transmissions.

19. The method of claim 18, wherein obtaining the antenna subset list comprises receiving a signal which contains the antenna subset list from the scheduling unit.

20. The method of claim 18, wherein obtaining the antenna subset list comprises creating the antenna subset list after receiving signals from one or more of the virtual antennas associated with the scheduling unit.

21. The method of claim 18, wherein obtaining the antenna subset list comprises interfacing with a GPS unit and retrieving an antenna subset list that is stored in memory by utilizing positional information provided by the GPS unit.

22. The method of claim 18, further comprising transmitting the antenna subset list from the communication device to the scheduling unit/base station(s).

23. The method of claim 18, wherein sending an antenna selection signal further comprises including information to prevent one or more of the virtual antenna(s) that were indicated as being available in the antenna subset list from being selected for the subsequent transmissions.

24. The method of claim 23, wherein the antenna subset list is communicated to/from the communication device and the scheduling unit at a different rate than the antenna subset mask is communicated to/from the communication device and the scheduling unit.

25. The method of claim 18, wherein the using the antenna subset list comprises using a weighted antenna subset mask to prioritize one or more of the virtual antenna(s) that where indicated as being available in the antenna subset list.

26. The method of claim 18, wherein the antenna subset list comprises:
a concurrent antenna subset list when the configuration of virtual antennas allows at least one virtual antenna to be selected for transmission;
a mutually exclusive antenna subset list when the configuration of virtual antennas allows at most one virtual antenna to be selected for transmission;
a concurrent combination of a first antenna subset list and a second antenna subset list that allows at least one virtual antenna to be selected from the first antenna subset list and/or at least one virtual antenna to be selected from the second antenna subset list; or
a mutually exclusive combination of a first antenna subset list and a second antenna subset list that allows one virtual antenna to be selected from either the first antenna subset list or the second antenna subset list.

27. A base station, comprising:
a scheduling unit; and
one or more configurations of virtual antennas, wherein the scheduling unit is configured to:
transmit an antenna subset list to a communication device, where the antenna subset list identifies one or more configurations of virtual antennas, wherein at least one identified configuration of virtual antennas includes a plurality of virtual antennas and wherein the antenna subset list indicates whether one virtual antenna or multiple virtual antennas of the at least one identified configuration can be selected for transmission; and receive an antenna selection signal from the communication device, where the antenna selection signal contains information indicating one or more selected virtual antenna(s) to use for subsequent transmissions to the communication device, the scheduling unit further configured to utilize an antenna subset mask to prevent one or more of the virtual antenna(s) identified in the antenna subset list from being selected by the communication device.

28. The base station of claim 27, wherein the received antenna selection signal includes the antenna subset mask to prevent one or more of the virtual antenna(s) identified in the antenna subset list from being selected by the communication device.

29. The base station of claim 28, wherein the base station is configured to communicate the antenna subset list to/from the communication device at a different rate than the antenna subset mask is communicated to/from the communication device.

30. The base station of claim 27, wherein the scheduling unit is configured to utilize a weighted antenna subset mask to prioritize one or more of the virtual antenna(s) identified in the antenna subset list.

31. The base station of claim 27, wherein the antenna subset list comprises:
a concurrent antenna subset list when the configuration of virtual antennas allows at least one virtual antenna to be selected for transmission;
a mutually exclusive antenna subset list when the configuration of virtual antennas allows at most one virtual antenna to be selected for transmission;
a concurrent combination of a first antenna subset list and a second antenna subset list that allows at least one virtual antenna to be selected from the first antenna subset list and/or at least one virtual antenna to be selected from the second antenna subset list; or
a mutually exclusive combination of a first antenna subset list and a second antenna subset list that allows one virtual antenna to be selected from either the first antenna subset list or the second antenna subset list.

32. A communication system, comprising:
a scheduling unit and at least one base station configured to transmit an antenna subset list that identifies one or more configurations of virtual antennas associated with the base station(s), wherein at least one identified configuration of virtual antennas includes a plurality of virtual antennas and wherein the antenna subset list indicates whether one virtual antenna or multiple virtual antennas of the at least one identified configuration can be selected for wireless transmission; and
a communication device configured to:
receive the antenna subset list;
use the antenna subset list to select one or more virtual antenna(s) to use for subsequent transmissions, wherein the antenna subset list is associated with an antenna subset mask that prevents one or more of the virtual antenna(s) that were available per the antenna subset list from being selected for subsequent transmissions; and
transmit an antenna selection signal which contains information indicating the selected virtual antenna(s) to use for the subsequent transmissions, wherein the base station(s) and the scheduling unit are further configured to receive the antenna selection signal and use the selected virtual antenna(s) associated with the base station(s) to send the subsequent wireless transmissions to the communication device.

33. The communication system of claim 32, wherein the antenna selection signal includes the antenna subset mask that prevents one or more of the virtual antenna(s) that were available per the antenna subset list from being selected by the communication device.

34. The communication system of claim 33, wherein the communication device and the scheduling unit are configured to communicate the antenna subset list at a different rate than the antenna subset mask is communicated.

35. The communication system of claim 32, wherein the antenna subset list is associated with a weighted antenna subset mask that prioritizes one or more of the virtual antenna(s) that were available per the antenna subset list.

36. The communication system of claim 32, wherein the antenna subset list comprises:
  a concurrent antenna subset list when the configuration of virtual antennas allows at least one virtual antenna to be selected for transmission;
  a mutually exclusive antenna subset list when the configuration of virtual antennas allows at most one virtual antenna to be selected for transmission;
  a concurrent combination of a first antenna subset list and a second antenna subset list that allows at least one virtual antenna to be selected from the first antenna subset list and/or at least one virtual antenna to be selected from the second antenna subset list: or
  a mutually exclusive combination of a first antenna subset list and a second antenna subset list that allows one virtual antenna to be selected from either the first antenna subset list or the second antenna subset list.

37. The communication system of claim 32, wherein the communication device is configured to receive another antenna subset list from another scheduling unit to help facilitate a handover from the scheduling unit to the another scheduling unit.

38. The communication system of claim 32, wherein the communication device is configured to receive an antenna subset list that is further augmented to include information about a configuration of virtual antennas associated with another scheduling unit to help facilitate a handover from the scheduling unit to the another scheduling unit.

39. The communication system of claim 32, wherein the communication system comprises a plurality of base stations that are distributed throughout a geographical coverage area associated with the scheduling unit.

\* \* \* \* \*